UNITED STATES PATENT OFFICE.

ALOIS SCHAIDHAUF, OF FRANKFORT-ON-THE-MAIN, GERMANY, ASSIGNOR TO ROESSLER & HASSLACHER CHEMICAL CO., OF NEW YORK, N. Y.

STABLE HYDROGEN PEROXID AND METHOD OF MAKING THE SAME.

1,275,765.  Specification of Letters Patent.  Patented Aug. 13, 1918.

No Drawing. Application filed August 2, 1912. Serial No. 712,852.

*To all whom it may concern:*

Be it known that I, ALOIS SCHAIDHAUF, a subject of the Emperor of Germany, and resident of Frankfort o. M. Germany, have invented certain new and useful Improvements in Stable Hydrogen Peroxid and Methods of Making the Same, of which the following is a specification.

This invention relates to a stable hydrogen peroxid and method of making the same.

The solution of the problem of preserving the stability of a hydrogen peroxid solution is very important as hydrogen-peroxid solutions are used for many industrial purposes. Though a great many chemicals have been suggested their stabilizing effect on the hydrogen-peroxid has not been lasting enough and such solutions neither proved economical in their application nor could they be stored for a great length of time without sustaining losses. The most reliable agent to prevent the solution, when stored, from undergoing decomposition is still the addition of some acid as for instance, sulfuric acid, phosphoric acid, etc.; but the application of hydrogen-peroxid for many purposes, especially for bleaching processes, demands an alkaline reaction and in this case much active oxygen escapes unused into the air.

I have discovered a process for manufacturing alkaline as well as neutral solutions containing free hydrogen peroxid or such in the latent form of a perborate, which have excellent properties inasmuch as their available oxygen is very effectively used and as there are practically no losses of oxygen, even if the solutions are stored for a considerable length of time. This new process is based on the observation of the most surprising fact that solutions containing active oxygen attain a very satisfactory stability on the addition of an insoluble aluminium-compound as for instance, aluminium-hydroxid, aluminium-oxid, aluminium-silicate, etc., said insoluble aluminium-compound being preferably in a very finely divided state.

The following example serves to illustrate my invention:

A solution of hydrogen-peroxid containing some alkali-metal alum is treated with sodium-hydrate until insoluble aluminium-hydroxid is formed. The extreme stability of a hydrogen-peroxid, treated by above method, is dependent on the presence of an insoluble aluminium-compound, as is convincingly proved by the following experiment:

The hydrogen-peroxid solution with the finely divided insoluble aluminium-hydroxid suspended in it is stirred until the precipitate is evenly distributed all through the liquid and the liquid is then divided into two equal portions. One portion is deprived of the precipitate by filtering off the same, whereas the other portion retains the aluminium-hydroxid; both liquors are then allowed to stand under the same conditions for some time. The liquor without the precipitate naturally is clear while the other one will clear up as the precipitate settles at the bottom of the container. If each of the portions is now tested within a few days, one obtains the surprising result that the liquor with the precipitate did not lose any oxygen at all whereas the other liquor, deprived of the precipitate by filtering, has lost all of its active oxygen. This stabilizing effect of insoluble aluminium-compounds prevails at low as well as at high temperatures and is the more important as it protects hydrogen peroxid solutions against decomposition no matter whether they are pure or whether they contain impurities, as for instance, manganese-compounds, which usually are considered to be agents accelerating decomposition.

If it is preferred to make a solution containing active oxygen, from a solid substance, as for instance, sodium perborate, the alum may be directly added to the solid perborate thus obtaining the insoluble aluminium compound immediately on making the solution.

Where I refer in the claims to the submitting of a solution of a per-salt or of a perborate to the action of an insoluble aluminium compound, I mean to include said solution and said insoluble compound however prepared, viz: whether separately prepared and subsequently brought together or whether the insoluble aluminium compound is formed within the solution, or whether a solid per-salt or perborate is mixed together with a solid soluble aluminium compound and dissolved to form the desired insoluble aluminium compound,

What I claim and desire to secure by Letters Patent is:

1. The method of rendering a solution containing active oxygen stable which consists in submitting a non-acid solution containing active oxygen to the action of an insoluble aluminium compound.

2. The method of rendering a solution containing hydrogen peroxid stable which consists in submitting a non-acid solution of hydrogen peroxid to the action of an insoluble aluminium compound.

3. A stabilized solution containing active oxygen comprising as an end product a solution of neutral or alkaline reaction containing active oxygen and sensible proportions of an insoluble aluminium compound.

4. A stabilized solution of hydrogen peroxid comprising as an end product a solution of hydrogen peroxid of non-acid reaction and sensible proportions of an insoluble aluminium compound.

In testimony whereof I have signed my name to this specification in the presence of two subscribing witnesses.

ALOIS SCHAIDHAUF.

Witnesses:
EMIL SCHELLER,
LUDWIG GATSNER.